US012652574B2

(12) United States Patent
Kanamarlapudi et al.

(10) Patent No.: US 12,652,574 B2
(45) Date of Patent: Jun. 9, 2026

(54) TECHNIQUES FOR PACKET DATA CONVERGENCE PROTOCOL AND RADIO LINK CONTROL SEQUENCE NUMBER SYNCHRONIZATION

(71) Applicant: QUALCOMM Incorporated, San Diego, CA (US)

(72) Inventors: Sitaramanjaneyulu Kanamarlapudi, San Diego, CA (US); Uttam Vyas, Hyderabad (IN); Leena Zacharias, San Jose, CA (US); Manjinder Singh Sandhu, Poway, CA (US); Touseef Khan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 364 days.

(21) Appl. No.: 18/042,131

(22) PCT Filed: Oct. 21, 2021

(86) PCT No.: PCT/US2021/071976
§ 371 (c)(1),
(2) Date: Feb. 17, 2023

(87) PCT Pub. No.: WO2022/094529
PCT Pub. Date: May 5, 2022

(65) Prior Publication Data
US 2023/0319630 A1 Oct. 5, 2023

(30) Foreign Application Priority Data
Oct. 27, 2020 (IN) .............................. 202041046809

(51) Int. Cl.
*H04W 28/06* (2009.01)
*H04L 47/34* (2022.01)

(52) U.S. Cl.
CPC ............. *H04W 28/06* (2013.01); *H04L 47/34* (2013.01)

(58) Field of Classification Search
CPC ...... H04W 28/06; H04W 28/02; H04L 47/34; H04L 25/0224; H04L 5/0051
See application file for complete search history.

(56) References Cited

U.S. PATENT DOCUMENTS

| | | | | | |
|---|---|---|---|---|---|
| 2008/0310368 | A1* | 12/2008 | Fischer | ................. | H04W 36/02 |
| | | | | | 370/331 |
| 2012/0201228 | A1* | 8/2012 | Wu | ........................ | H04W 76/19 |
| | | | | | 370/336 |

(Continued)

FOREIGN PATENT DOCUMENTS

| | | |
|---|---|---|
| CN | 101689922 A | 3/2010 |
| CN | 107852283 A | 3/2018 |

(Continued)

OTHER PUBLICATIONS

International Search Report and Written Opinion—PCT/US2021/071976—ISA/EPO—Feb. 3, 2022.

*Primary Examiner* — Christine Ng
(74) *Attorney, Agent, or Firm* — Harrity & Harrity, LLP

(57) ABSTRACT
Various aspects of the present disclosure generally relate to wireless communication. In some aspects, a user equipment (UE) may receive, at a packet data convergence protocol (PDCP) layer, a packet having a PDCP sequence number. The UE may determine whether the received packet, having the PDCP sequence number, satisfies one or more reordering criteria. The UE may discard, before an expiration of a reordering timer, the received packet based at least in part on the determination of whether the received packet satisfies the one or more reordering criteria. Numerous other aspects are provided.

26 Claims, 8 Drawing Sheets

600 ➝

610 ～ Receive, at a packet data convergence protocol (PDCP) layer, a packet having a PDCP sequence number 620 ～ Determine whether the received packet, having the PDCP sequence number, satisfies one or more reordering criteria 630 ～ Discard, before an expiration of an reordering timer, the received packet based at least in part on the determination of whether the received packet satisfies the one or more reordering criteria

(56)                   References Cited

U.S. PATENT DOCUMENTS

2014/0112157  A1*   4/2014   Han  ......................... H04L 69/22
                                                          370/242
2015/0327236  A1*  11/2015   Lin  ......................... H04L 47/34
                                                          370/329
2017/0041767  A1    2/2017   Vajapeyam et al.
2017/0135023  A1*   5/2017   Jung  ..................... H04W 40/12
2020/0037204  A1*   1/2020   Gurumoorthy  ......... H04L 69/04
2020/0100142  A1*   3/2020   Kim  ...................... H04W 76/27
2020/0344629  A1*  10/2020   Kim  ...................... H04W 48/16
2020/0351725  A1*  11/2020   Kim  ...................... H04W 36/08
2020/0403928  A1*  12/2020   Amend  ................. H04L 47/624
2022/0322078  A1*  10/2022   Xu  ......................... H04W 76/15

FOREIGN PATENT DOCUMENTS

CN          111133791  A    5/2020
EP            3669573  B1    1/2022
KR         20190032167  A    3/2019

* cited by examiner

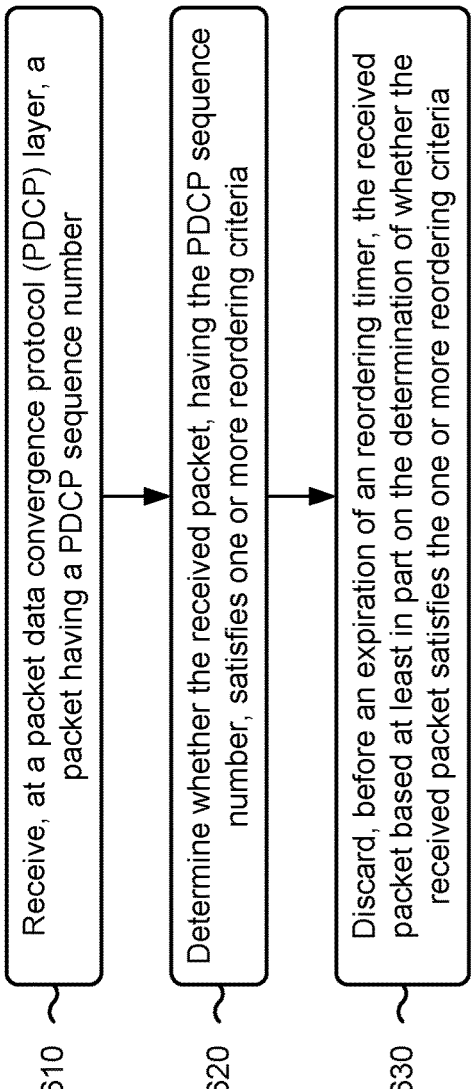

Receive, at a packet data convergence protocol (PDCP) layer, a packet having a PDCP sequence number Determine whether the received packet, having the PDCP sequence number, satisfies one or more reordering criteria Discard, before an expiration of an reordering timer, the received packet based at least in part on the determination of whether the received packet satisfies the one or more reordering criteria

610

620

630

600

Reception Component 702

PDCP Component 708

RLC Component 710

Transmission Component 704

706

TECHNIQUES FOR PACKET DATA CONVERGENCE PROTOCOL AND RADIO LINK CONTROL SEQUENCE NUMBER SYNCHRONIZATION

CROSS-REFERENCE TO RELATED APPLICATIONS

This Patent Application is a 371 National Stage of PCT/US2021/071976, filed Oct. 21, 2021, entitled "TECHNIQUES FOR PACKET DATA CONVERGENCE PROTOCOL AND RADIO LINK CONTROL SEQUENCE NUMBER SYNCHRONIZATION," which claims priority to India patent application No. 202041046809, filed on Oct. 27, 2020, entitled "TECHNIQUES FOR PACKET DATA CONVERGENCE PROTOCOL AND RADIO LINK CONTROL SEQUENCE NUMBER SYNCHRONIZATION," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for packet data convergence protocol and radio link control sequence number synchronization.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, at a packet data convergence protocol (PDCP) layer, a packet having a PDCP sequence number; determining whether the received packet, having the PDCP sequence number, satisfies one or more reordering criteria; and discarding, before an expiration of a reordering timer, the received packet based at least in part on the determination of whether the received packet satisfies the one or more reordering criteria.

In some aspects, receiving the packet includes receiving the packet after an event associated with a reset of one or more state variables. In some aspects, the determination of whether the received packet satisfies the one or more reordering criteria includes determining whether the received packet is received after an event associated with a reset of one or more state variables. In some aspects, the reset of the one or more state variables is associated with at least one of: a full configuration procedure, a radio link control entity re-establishment procedure, or a PDCP entity re-establishment procedure.

In some aspects, the determination of whether the received packet satisfies the one or more reordering criteria includes determining whether the PDCP sequence number of the received packet differs from one or more PDCP sequence numbers of a reordering window associated with the reordering timer by a threshold amount. In some aspects, the determination of whether the received packet satisfies the one or more reordering criteria includes determining whether the PDCP sequence number of the received packet is in-order with respect to one or more other PDCP sequence numbers associated with one or more other packets received after a state variable reset event. In some aspects, the determination of whether the received packet satisfies the one or more reordering criteria includes determining whether the PDCP sequence number of the received packet is in-order with respect to one or more other PDCP sequence numbers associated with one or more other packets received before a state variable reset event.

In some aspects, a UE for wireless communication includes a memory and one or more processors coupled to the memory, the one or more processors configured to: receive, at a PDCP layer, a packet having a PDCP sequence number; determine whether the received packet, having the PDCP sequence number, satisfies one or more reordering criteria; and discard, before an expiration of a reordering timer, the received packet based at least in part on the determination of whether the received packet satisfies the one or more reordering criteria.

In some aspects, the one or more processors, when receiving the packet, are configured to receive the packet after an event associated with a reset of one or more state variables. In some aspects, the one or more processors, when determining whether the received packet satisfies the one or more reordering criteria, are configured to determine whether the received packet is received after an event associated with a reset of one or more state variables. In some aspects, the reset of the one or more state variables is associated with at least one of: a full configuration procedure, a radio link control entity re-establishment procedure, or a PDCP entity re-establishment procedure.

In some aspects, the one or more processors, when determining whether the received packet satisfies the one or more reordering criteria, are configured to determine whether the PDCP sequence number of the received packet differs from one or more PDCP sequence numbers of a reordering window associated with the reordering timer by a threshold amount. In some aspects, the one or more processors, when determining whether the received packet satisfies the one or more reordering criteria, are configured to determine whether the PDCP sequence number of the received packet is in-order with respect to one or more other PDCP sequence numbers associated with one or more other packets received after a state variable reset event. In some aspects, the one or more processors, when determining whether the received packet satisfies the one or more reordering criteria, are configured to determine whether the PDCP sequence number of the received packet is in-order with respect to one or more other PDCP sequence numbers associated with one or more other packets received before a state variable reset event.

In some aspects, a non-transitory computer-readable medium storing a set of instructions for wireless communication includes one or more instructions that, when executed by one or more processors of a UE, cause the UE to: receive, at a PDCP layer, a packet having a PDCP sequence number; determine whether the received packet, having the PDCP sequence number, satisfies one or more reordering criteria; and discard, before an expiration of a reordering timer, the received packet based at least in part on the determination of whether the received packet satisfies the one or more reordering criteria.

In some aspects, the one or more instructions, that cause the UE to receive the packet, cause the UE to receive the packet after an event associated with a reset of one or more state variables. In some aspects, the one or more instructions, that cause the one or more processors to determine whether the received packet satisfies the one or more reordering criteria, cause the one or more processors to: determine whether the received packet is received after an event associated with a reset of one or more state variables. In some aspects, the reset of the one or more state variables is associated with at least one of: a full configuration procedure, a radio link control entity re-establishment procedure, or a PDCP entity re-establishment procedure.

In some aspects, the one or more instructions, that cause the one or more processors to determine whether the received packet satisfies the one or more reordering criteria, cause the one or more processors to determine whether the PDCP sequence number of the received packet differs from one or more PDCP sequence numbers of a reordering window associated with the reordering timer by a threshold amount. In some aspects, the one or more instructions, that cause the one or more processors to determine whether the received packet satisfies the one or more reordering criteria, cause the one or more processors to determine whether the PDCP sequence number of the received packet is in-order with respect to one or more other PDCP sequence numbers associated with one or more other packets received after a state variable reset event. In some aspects, the one or more instructions, that cause the one or more processors to determine whether the received packet satisfies the one or more reordering criteria, cause the one or more processors to determine whether the PDCP sequence number of the received packet is in-order with respect to one or more other PDCP sequence numbers associated with one or more other packets received before a state variable reset event.

In some aspects, an apparatus for wireless communication includes means for receiving, at a PDCP layer, a packet having a PDCP sequence number; means for determining whether the received packet, having the PDCP sequence number, satisfies one or more reordering criteria; and means for discarding, before an expiration of a reordering timer, the received packet based at least in part on the determination of whether the received packet satisfies the one or more reordering criteria.

In some aspects, the means for receiving the packet includes means for receiving the packet after an event associated with a reset of one or more state variables. In some aspects, the means for determining whether the received packet satisfies the one or more reordering criteria includes means for determining whether the received packet is received after an event associated with a reset of one or more state variables. In some aspects, the reset of the one or more state variables is associated with at least one of: a full configuration procedure, a radio link control entity re-establishment procedure, or a PDCP entity re-establishment procedure.

In some aspects, the means for determining whether the received packet satisfies the one or more reordering criteria includes means for determining whether the PDCP sequence number of the received packet differs from one or more PDCP sequence numbers of a reordering window associated with the reordering timer by a threshold amount. In some aspects, the means for determining whether the received packet satisfies the one or more reordering criteria includes means for determining whether the PDCP sequence number of the received packet is in-order with respect to one or more other PDCP sequence numbers associated with one or more other packets received after a state variable reset event. In some aspects, the means for determining whether the received packet satisfies the one or more reordering criteria includes means for determining whether the PDCP sequence number of the received packet is in-order with respect to one or more other PDCP sequence numbers associated with one or more other packets received before a state variable reset event.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process associated with PDCP and RLC sequence number synchronization, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
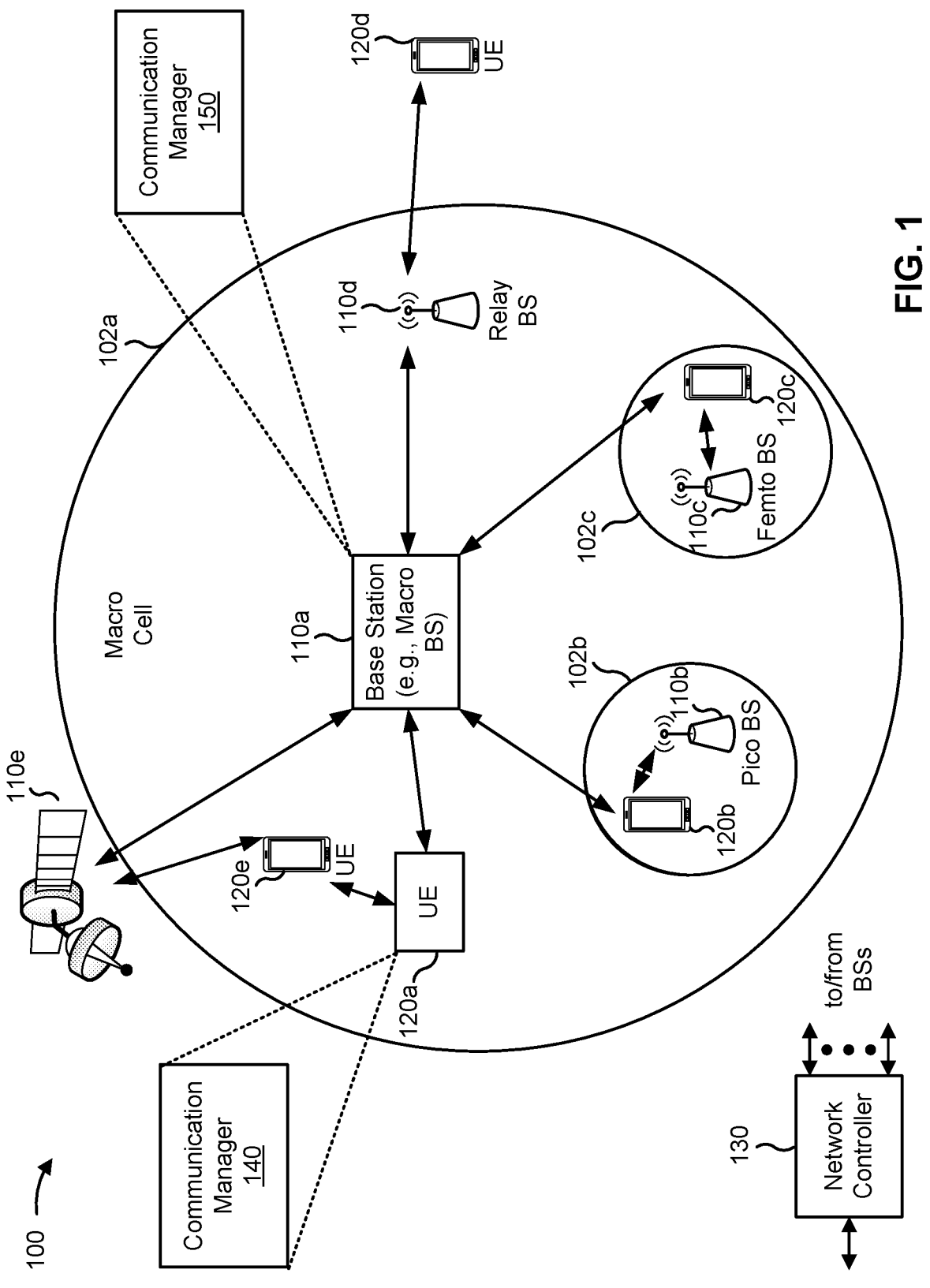
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, a BS 110d, and a BS 110e), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. The BS 110e (e.g., a non-terrestrial network (NTN) base station) may communicate with UE 120e and/or relay communications between UE 120e and base station 110a. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band. In some cases, frequencies greater than those of FR2 (e.g., greater than 52.6 GHz or greater than 60 GHz) may be referred to as "FR2+" frequencies and may be used for communication between network devices, such as between base stations and other base stations, base stations and satellites, satellites and UEs, UEs and other UEs, or base stations and UEs, among other examples of communications described herein.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR2+, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, at a packet data convergence protocol (PDCP) layer, a packet having a PDCP sequence number; determine whether the received packet, having the PDCP sequence number, satisfies one or more reordering criteria; and discard, before an expiration of a reordering timer, the received packet based at least in part on the determination of whether the received packet satisfies the one or more reordering criteria. Additionally, or alternatively, the communication manager 140 may perform one or more other operations described herein.

In some aspects, the base station 110 may include a communication manager 150. As described in more detail elsewhere herein, the communication manager 150 may communicate with UE 120 to determine whether to resynchronize a bearer. Additionally, or alternatively, the communication manager 150 may perform one or more other operations described herein.

As indicated above, FIG. 1 is provided as an example. Other examples may differ from what is described with regard to FIG. 1.

Figure 2:
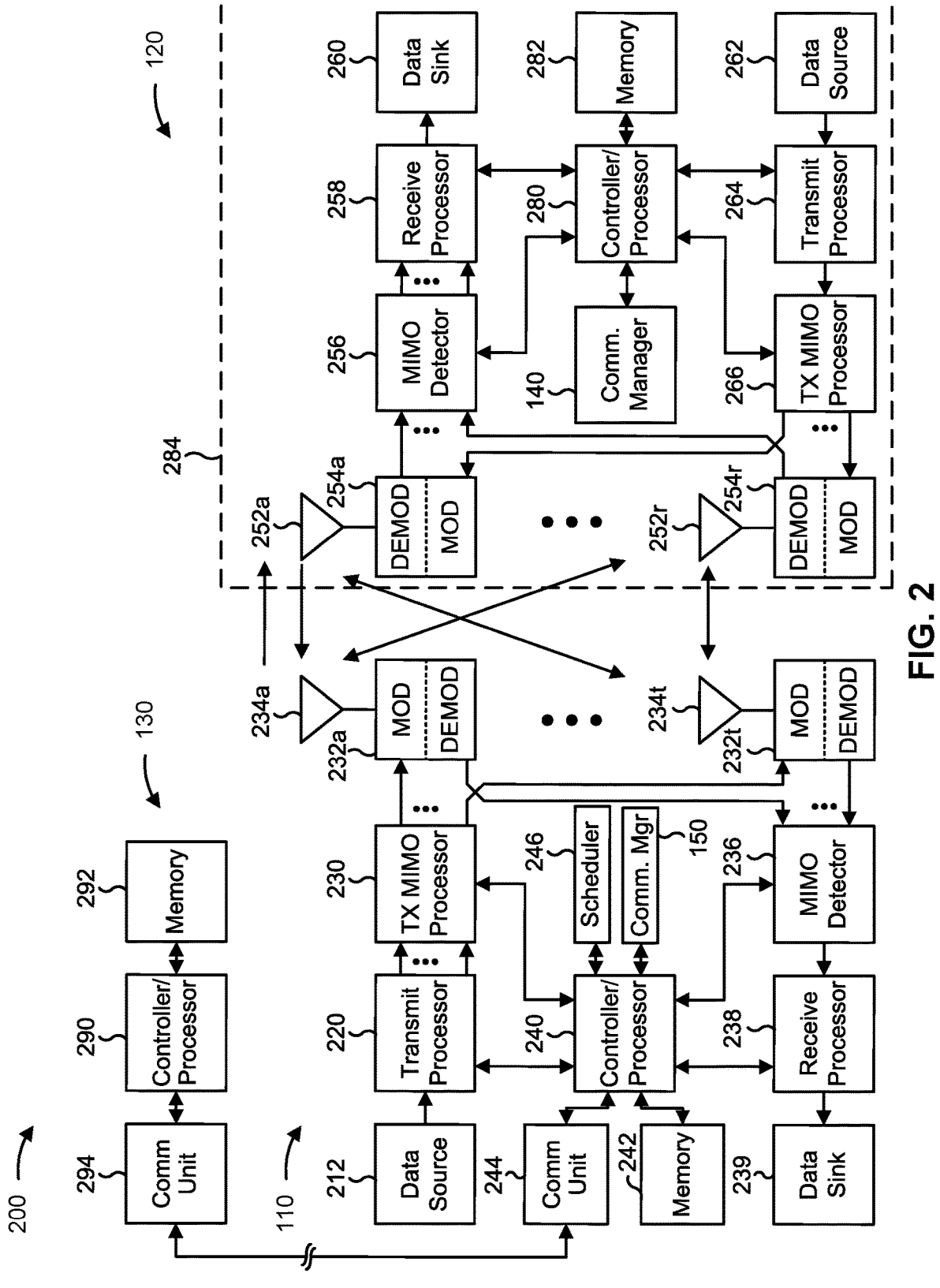
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with packet data convergence protocol (PDCP) and radio link control (RLC) sequence number synchronization, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, UE 120 may include means for receiving, at a PDCP layer, a packet having a PDCP sequence number, means for determining whether the received packet, having the PDCP sequence number, satisfies one or more reordering criteria, means for discarding, before an expiration of a reordering timer, the received packet based at least in part on the determination of whether the received packet satisfies the one or more reordering criteria, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
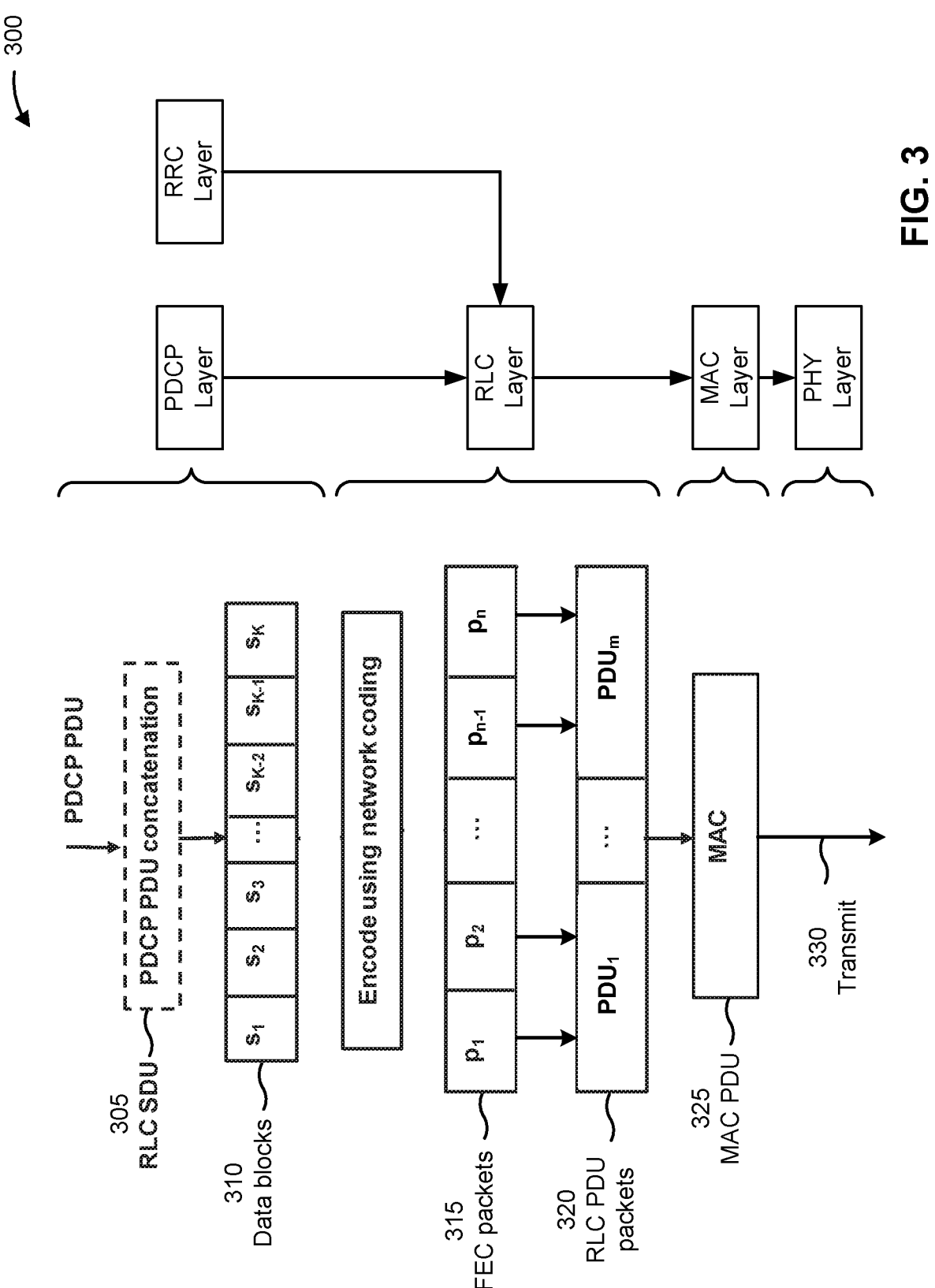
FIG. 3 is a diagram illustrating an example of network coding, in accordance with the present disclosure.

FIG. 3 is a diagram illustrating an example 300 of network coding, in accordance with various aspects of the present disclosure. The operations described in connection with FIG. 3 may be performed by a transmitter (also referred to as an encoder), such as a base station 110.

As shown by reference number 305, a transmitter (e.g., the base station 110) may generate an RLC service data unit (SDU) from one or more packet data convergence protocol (PDCP) protocol data units (PDUs). In some aspects, a single PDCP PDU is included in an RLC SDU. In some aspects, multiple PDCP PDUs are included in an RLC SDU (e.g., by concatenating multiple PDCP PDUs). For example, an RLC SDU with a particular RLC sequence number (SN) may include a first PDCP PDU with a first PDCP SN and a second PDCP PDU with a second PDCP SN. The RLC SN may enable a receiver to perform RLC reassembly at the RLC layer and the PDCP SN may enable the receiver to perform PDCP reordering at the PDCP layer.

In some aspects, the transmitter determines whether to include a single PDCP PDU in a single RLC SDU or whether to concatenate multiple PDCP PDUs in a single RLC SDU based at least in part on a size of the PDCP PDU. For example, if the size of the PDCP PDU satisfies a threshold (e.g., is greater than or equal to the threshold), then the encoder may include only the PDCP PDU (e.g., a single PDCP PDU) in a single RLC SDU. If the size of the PDCP PDU does not satisfy a threshold (e.g., is less than or equal to the threshold), then the encoder may concatenate multiple PDCP PDUs (e.g., a set of PDCP PDUs with a total size that is less than or equal to the threshold) into a single RLC SDU.

As shown by reference number 310, the transmitter may divide the RLC SDU into a plurality of data blocks. For example, the transmitter may divide the RLC SDU into K data blocks, shown as $s_1$ through $s_K$, based at least in part on the set of network coding parameters. In some aspects, the set of network coding parameters specify the value of K for a particular set of sub-parameters, such as a payload size for the RLC SDU, a size of an SN field in an RLC PDU header for the RLC SDU, and/or the like. In some aspects, the encoder determines the value of K for a set of sub-parameters.

In some aspects, the operations associated with reference number 305 and 310 may be performed at the PDCP layer of the transmitter. The PDCP layer may provide the data blocks to the RLC layer of the transmitter. As shown by reference number 315, the transmitter may encode the K data blocks into n forward error correction (FEC) packets using network coding. For example, the transmitter may encode the K data blocks into the n FEC packets, shown as $p_1$ through $p_n$, based at least in part on a rateless code, such as a network code, a fountain code, a Luby transform (LT) code, a Raptor code, and/or the like. In particular, the transmitter may encode the K data blocks into the n FEC packets such that the n FEC packets include additional information or bits for purposes of forward error correction. This permits FEC packets to be recovered by a receiver, for example, if the quantity of received FEC packets is larger than the quantity of K data blocks regardless of which FEC packets are received.

In some aspects, the number of RLC packets (e.g., the value of m) is based at least in part on the set of network coding parameters. In some aspects, the set of network coding parameters specifies the value of m for a particular set of sub-parameters, a delay budget for the RLC SDU packets, available encoding and decoding computation resources of the transmitter, the value of K (e.g., the quantity of data blocks), a target error probability for one or more RLC PDU packets for the N FEC packets, channel conditions for transmission of the RLC PDU packets(s), the type of network code that is to be used to encode the K data blocks into the N FEC packets, and/or the like. In some aspects, the transmitter may determine the value of N for a set of sub-parameters.

As shown by reference number 320, the transmitter may map the N FEC packets to a corresponding m RLC PDU packets. For example, the transmitter may map N FEC packets to M RLC PDU packets, shown as $PDU_1$ through $PDU_M$, such that each RLC PDU includes a plurality of FEC packets (e.g., two FEC packets per RLC PDU packet, four FEC packets per RLC PDU packet, and/or the like). In some aspects, the operations associated with reference number 315 and 320 are performed at the RLC layer of the transmitter. The RLC layer may receive an indication of the set of network coding parameters from the radio resource control (RRC) layer and may perform the operations associated with reference number 315 and 320 based at least in part on the set of network coding parameters.

The RLC layer may provide the m RLC PDU packets to the MAC layer of the transmitter. As shown by reference number 325, the transmitter may generate a MAC PDU for the m RLC PDU packets. In some aspects, the MAC PDU includes an RLC PDU header or a MAC PDU header, which may include information associated with each of the m RLC PDUs. For example, the RLC PDU header or MAC PDU header may include a sequence number field, which may indicate a sequence number associated with each of the m RLC PDUs. In some aspects, the operations associated with reference number 325 are performed at the MAC layer of the transmitter.

The MAC layer of the transmitter may provide the MAC PDU to the physical (PHY) layer of the transmitter. As shown by reference number 330, the encoder may transmit the m RLC PDU packets (e.g., in the MAC PDU) to a receiver (also referred to as a decoder), such as a UE 120 or a base station 110. In some aspects, the PHY layer of the transmitter may transmit the m RLC PDU packets (e.g., in the MAC PDU) over a wireless physical channel, such as a physical downlink shared channel (PDSCH), a physical downlink control channel (PDCCH), a physical uplink shared channel (PUSCH), a physical uplink control channel (PUCCH), a physical sidelink control channel (PSCCH), a physical sidelink shared channel (PSSCH), and/or the like.

As indicated above, FIG. 3 is provided as an example. Other examples may differ from what is described with respect to FIG. 3.

Figure 4:
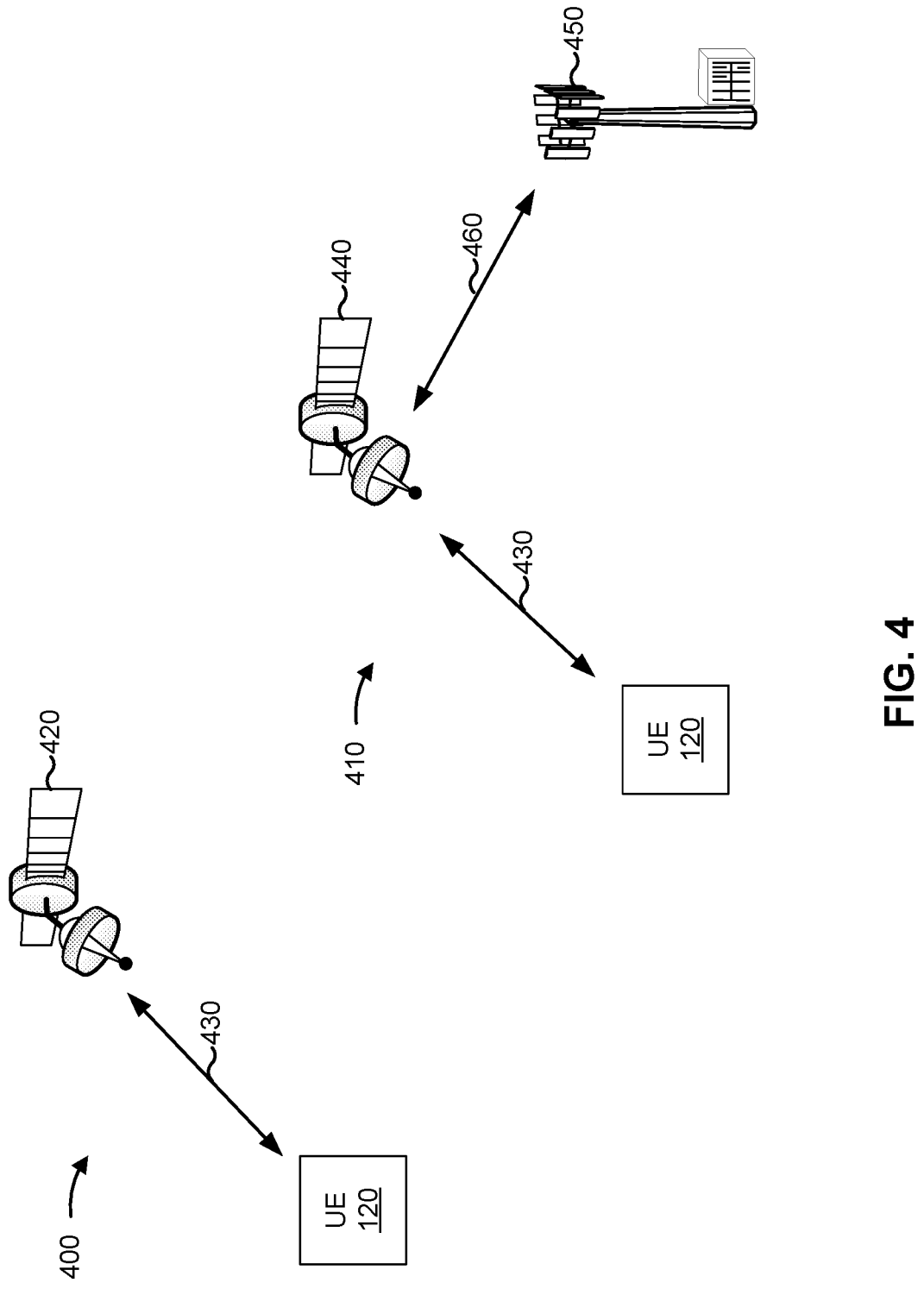
FIG. 4 is a diagram illustrating an example of a non-terrestrial network, in accordance with the present disclosure.

FIG. 4 is a diagram illustrating an example 400 of a regenerative satellite deployment and an example 410 of a transparent satellite deployment in a non-terrestrial network.

Example 400 shows a regenerative satellite deployment. In example 400, a UE 120 is served by a satellite 420 via a service link 430. For example, the satellite 420 may include a base station 110 (e.g., BS 110a) or a gNB. In some aspects, the satellite 420 may be referred to as a non-terrestrial base station, a regenerative repeater, or an on-board processing repeater. In some aspects, the satellite 420 may demodulate an uplink radio frequency signal, and may modulate a baseband signal derived from the uplink radio signal to produce a downlink radio frequency transmission. The satellite 420 may transmit the downlink radio frequency signal on the service link 430. The satellite 420 may provide a cell that covers the UE 120.

Example 410 shows a transparent satellite deployment, which may also be referred to as a bent-pipe satellite deployment. In example 410, a UE 120 is served by a satellite 440 via the service link 430. The satellite 440 may be a transparent satellite. The satellite 440 may relay a signal received from gateway 450 via a feeder link 460. For example, the satellite may receive an uplink radio frequency transmission, and may transmit a downlink radio frequency transmission without demodulating the uplink radio frequency transmission. In some aspects, the satellite may frequency convert the uplink radio frequency transmission received on the service link 430 to a frequency of the uplink radio frequency transmission on the feeder link 460, and may amplify and/or filter the uplink radio frequency transmission. In some aspects, the UEs 120 shown in example 400 and example 410 may be associated with a Global Navigation Satellite System (GNSS) capability or a Global Positioning System (GPS) capability, though not all UEs have such capabilities. The satellite 440 may provide a cell that covers the UE 120.

The service link 430 may include a link between the satellite 440 and the UE 120, and may include one or more of an uplink or a downlink. The feeder link 460 may include a link between the satellite 440 and the gateway 450, and may include one or more of an uplink (e.g., from the UE 120 to the gateway 450) or a downlink (e.g., from the gateway 450 to the UE 120). An uplink of the service link 430 may be indicated by reference number 430-U (not shown in FIG. 4) and a downlink of the service link 430 may be indicated by reference number 430-D (not shown in FIG. 4). Similarly, an uplink of the feeder link 460 may be indicated by reference number 460-U (not shown in FIG. 4) and a downlink of the feeder link 460 may be indicated by reference number 460-D (not shown in FIG. 4).

The feeder link 460 and the service link 430 may each experience Doppler effects due to the movement of the satellites 420 and 440, and potentially movement of a UE 120. These Doppler effects may be significantly larger than in a terrestrial network. The Doppler effect on the feeder link 460 may be compensated for to some degree, but may still be associated with some amount of uncompensated frequency error. Furthermore, the gateway 450 may be associated with a residual frequency error, and/or the satellite 420/440 may be associated with an on-board frequency error. These sources of frequency error may cause a received downlink frequency at the UE 120 to drift from a target downlink frequency.

In some examples, a network may include a terrestrial master cell group (MCG) associated with gateway 450 and a secondary cell group (SCG) associated with satellite 440 (e.g., in low-earth orbit (LEO)). In this case, delays associated with a terrestrial link directly from the MCG to UE 120 and/or a non-terrestrial link (e.g., a link via satellite 440) may be approximately 10 milliseconds (ms) to 20 ms, which may result in out-of-order PDCP PDUs.

As indicated above, FIG. 4 is provided as an example. Other examples may differ from what is described with regard to FIG. 4.

As described above, a transmitter may transmit a set of packets generated from a set of PDCP PDUs. An order of a data unit, such as a PDCP PDU or RLC SDU, may be indicated by an accompanying sequence number. For example, the transmitter may generate a set of PDCP SNs accompanying a set of PDCP PDUs to enable a receiver to determine an order of the PDCP PDUs for decoding. During transmission, some packets and associated PDCP PDUs may arrive out-of-order with respect to the PDCP SNs of the PDCP PDUs. Accordingly, a PDCP layer of a receiver, among other examples, can provide reordering functionality. The PDCP layer may implement a reordering timer. When the reordering timer expires, the receiver (e.g., a UE) can deliver data in a PDCP buffer to an upper layer of the receiver. In this case, the upper layer may perform a reordering procedure, using PDCP SNs associated with PDCP packets, to reorder a set of out-of-order PDCP packets, thereby enabling successful decoding.

The reordering timer and an associated reordering window may be associated with a set of state variables to enable the receiver to determine whether a received PDCP packet is out-of-order and should be provided to the upper layer for reordering. In some cases, the receiver may reset a set of values of the set of state variables to a default or initial value. For example, after a RRC full configuration, the receiver may reset an expected RLC SN to an initial value (e.g., 0) and an expected PDCP SN to an initial value (e.g., 0). In this case, the receiver may be configured to receive RLC packets and PDCP packets with SNs of 0 or greater for reordering in a reordering window.

However, some PDCP packets, from before a completion of the reset of the set of state variables, may have PDCP SNs associated with a set of values for the set of state variables from before the reset of the set of state variables. In other words, before resetting the set of state variables, the receiver may have been configured to receive next PDCP packets with PDCP SNs of '1599' and '1600'. But the PDCP packets may be delayed between a PDCP layer and an RLC layer until after the reset of the set of state variables. As a result, the PDCP layer may receive the PDCP packets with an RLC SN of '0' and with PDCP SNs of '1599' and '1600' (rather than the expected RLC SN of '0' and PDCP SNs of '0' and '1'). The PDCP layer may then receive subsequent PDCP packets with RLC SNs of '1' and '2' and PDCP SNs of '0', '1', '2', and '3'.

In this case, the RLC SN of '0' is in-order with respect to the RLC layer, so the RLC payload (the PDCP packet) is delivered to the PDCP layer with abnormal PDCP SNs of '1599' and '1600'. The PDCP SN may be termed 'abnormal' based at least in part on the PDCP SN being within the reordering window, but differing from an expected next PDCP SN of the reordering window (e.g., '0') by more than a threshold amount (the threshold may be fixed for the receiver, set for the receiver by the transmitter, or determined based at least in part on a size of the reordering window, among other examples) This may occur in a first case as a result of the packet having been between the PDCP entity and the RLC entity concurrent with the state variable reset (in which case it may be desirable to drop the packet from the reordering window). Or, this may occur in a second case as a result of, for example, PDCP packets with PDCP SNs between the received PDCP SN and the next expected PDCP SN having been lost (in which case it may be desirable to maintain the packet in the reordering window). In other words, in the second case, the first PDCP SN may abnormal because PDCP packets with PDCP SNs '0' to '1598' have been lost, in which case it is desirable to maintain PDCP SN '1599' to avoid further loss of data.

Currently, when the reordering window is set to a relatively large value (e.g., 1601 or more, in this case), the PDCP layer determines that the PDCP packet with a PDCP SN '1599' is valid but out-of-order, causing the PDCP layer to queue the PDCP packet and causing the PDCP layer to wait for missing PDUs (e.g., PDCP packets with SNs of 0 to 1598). When a reordering timer expires, the PDCP layer delivers out-of-order PDCP packets (e.g., with PDCP SNs of '1599' and '1600') to an upper layer for reordering and resets the reordering window to a next expected SN (e.g., PDCP SN '1601').

However, the aforementioned subsequent RLC packets with RLC SNs of 1' and '2' and PDCP SNs of '0', '1', '2', and '3' may be determined valid at the RLC layer (e.g., based at least in part on the RLC SNs being in-order) and delivered to the PDCP layer where the PDCP SNs are now outside of the reordering window that starts at '1601'. Based at least in part on receiving PDCP packets with PDCP SNs outside of the reordering window, the PDCP layer discards the PDCP packets (e.g., any received PDCP packets with PDCP SNs from '0' to '1598'). Because the PDCP packets were successfully delivered at the RLC layer, the RLC layer delivers an RLC status PDU to a peer RLC entity indicating a success. However, because the PDCP packets were dropped at the PDCP layer, higher layer applications experience a data loss at the receiver, without hybrid automatic repeat request (HARQ) and other retransmission techniques being invoked to recover the data loss. Although the higher layer applications may invoke higher layer data recovery techniques, such data recovery techniques may result in negative performance impacts, such as increased overhead or increased latency, among other examples.

Some aspects described herein enable evaluation of a PDCP packet to determine whether to discard the PDCP packet from a reordering window (in the first case where the PDCP packet has an abnormal PDCP SN as a result of a state variable reset) or maintain the PDCP packet in the reordering window (in the second case where the PDCP packet has an abnormal PDCP SN as a result of a relatively large quantity of lost PDCP packets). In this way, a UE may avoid unnecessary data loss that may occur in the first case by resetting the reordering window to an SN greater than the abnormal PDCP SN. Further, the UE may avoid unnecessarily data loss that may occur in the second case by dropping the PDCP packet and/or one or more subsequent PDCP packets.

In other words, a UE may evaluate whether a PDCP SN of a received PDCP packet indicates that the PDCP packet was between the RLC layer and the PDCP layer at a reset of state variables for PDCP reordering. In this case, if so, the UE may discard the PDCP packet from the reordering window before expiration of a reordering timer, to avoid the reordering window resetting to a PDCP SN greater than a PDCP SN of the PDCP packet. In this way, the UE may avoid discarding large quantities of PDCP packets, thereby avoiding data loss and negative performance impacts associated with performing data loss recovery at higher layers of the UE.

Figure 5:
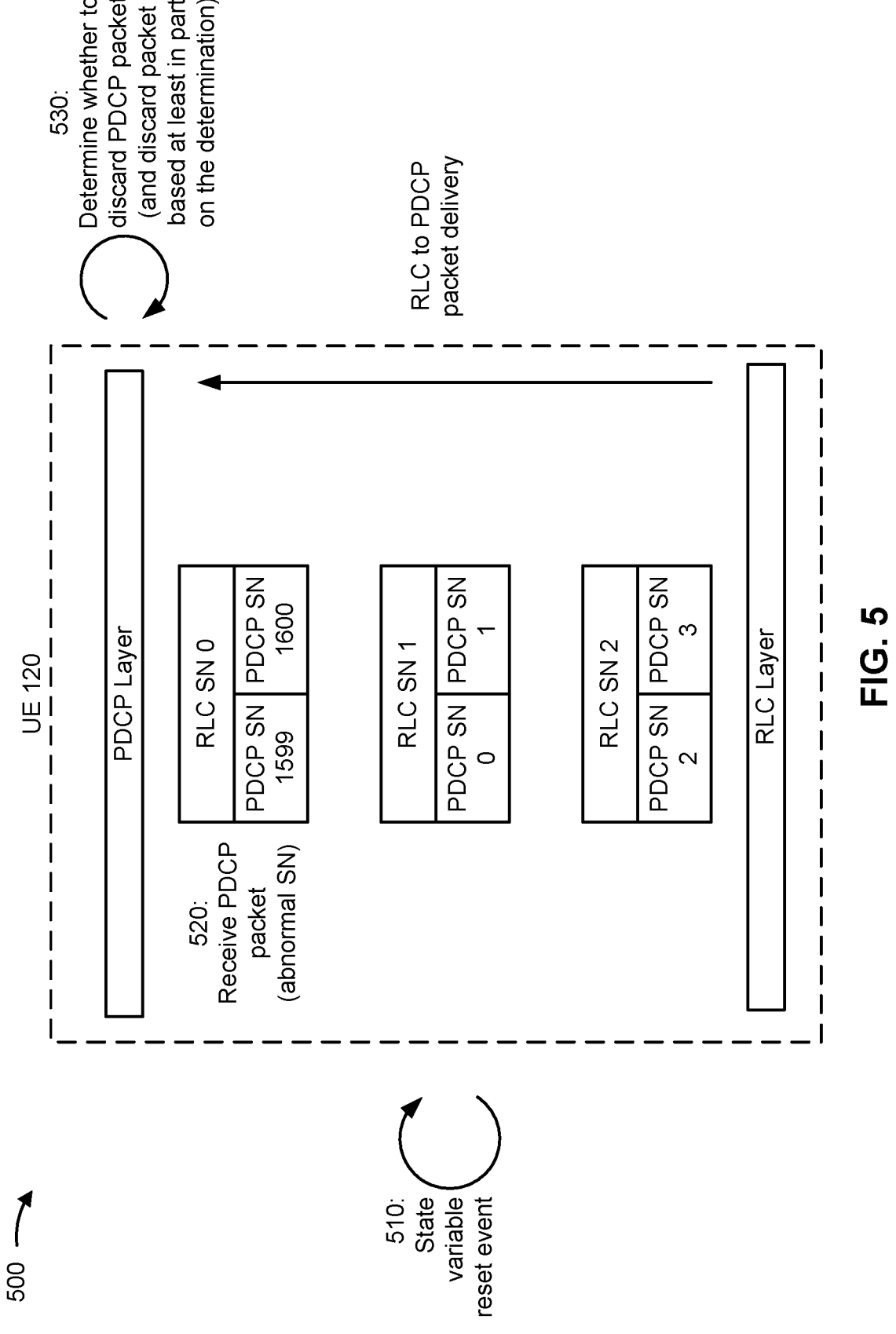
FIG. 5 is a diagram illustrating an example associated with packet data convergence protocol (PDCP) and radio link control (RLC) sequence number synchronization, in accordance with the present disclosure.

FIG. 5 is a diagram illustrating an example 500 associated with PDCP and RLC sequence number synchronization, in accordance with various aspects of the present disclosure. As shown in FIG. 5, example 500 includes communication between an RLC layer and a PDCP layer of a UE 120. In some aspects, UE 120 may be included in a wireless network in which UE 120 communicates with a base station 110, such as wireless network 100. Base station 110 and UE 120 may communicate via a wireless access link, which may include an uplink and a downlink.

As further shown in FIG. 5, and by reference number 510, UE 120 may reset a set of state variables in connection with a state variable reset event. For example, UE 120 may communicate with a base station 110 to perform an RRC procedure, which may include a full configuration at the RRC level. In this case, for the full configuration, the UE may reestablish a data radio bearer (DRB) associated with the PDCP entity and the RLC entity and may reset one or more state variables associated with the DRB, the PDCP entity, and/or the RLC entity to a default or initial value. Based at least in part on resetting the one or more state variables, UE 120 may ensure synchronization of data and status between UE 120 and base station 110. Additionally, or alternatively, UE 120 may reset a set of state variables in connection with another type of state variable reset event. For example, UE 120 may reset state variables in connection with an RLC entity re-establishment procedure or a PDCP entity re-establishment procedure.

As further shown in FIG. 5, and by reference number 520, UE 120 may receive, at the PDCP layer, a packet with an abnormal PDCP SN. For example, UE 120 may receive an RLC PDU with a valid RLC SN (e.g., an RLC SN of '0' which may be valid with respect to a reset RLC reassembly window state variable) and associated with a pair of PDCP PDUs with PDCP SNs of '1599' and '1600'. As described above, the RLC SN may be '0' but the PDCP PDUs may have abnormal PDCP SNs of '1599' and '1600' as a result of, for example, the packet being present between the PDCP entity and the RLC entity concurrent with the state variable reset. Although, in these cases, UE 120 has received a group of PDCP PDUs that are out-of-order, UE 120 may receive prior PDCP PDUs or subsequent PDCP PDUs that are in-order. In other words, out-of-order PDCP PDUs may include all PDCP PDUs in a particular time interval or only some of the PDCP PDUs in the particular time interval.

As further shown in FIG. 5, and by reference number 530, UE 120 may determine whether to discard the PDCP packet from a reordering window. For example, UE 120 may determine whether one or more reordering criteria are satisfied and, if so, may discard the PDCP packet from the reordering window before expiration of the reordering timer, thereby avoiding resetting a next expected PDCP SN of the reordering window to a value (e.g., '1601') that may cause data loss, as described above.

In some aspects, UE 120 may determine whether to discard the PDCP packet based at least in part on whether a state variable reset event has occurred. For example, when a state variable reset event has occurred, UE 120 may determine that the abnormal PDCP SN is a result of the PDCP packet being between the RLC entity and the PDCP entity at a time of the state variable reset rather than a result of a loss of a relatively large quantity of PDCP packets. In this case, UE 120 may determine that a state variable reset event occurred within a threshold time of receiving the PDCP packet and may determine that the abnormal PDCP SN is a result of the PDCP packet being between the RLC entity and the PDCP entity at a time of the state variable reset. Additionally, or alternatively, UE 120 may determine that the PDCP packet is a first PDCP packet (or received within less than a threshold quantity of PDCP packets) received after the state variable reset event, and may determine that the abnormal PDCP SN is a result of the PDCP packet being between the RLC entity and the PDCP entity at a time of the state variable reset.

Additionally, or alternatively, UE 120 may determine whether to discard the PDCP packet based at least in part on a value of the abnormal PDCP SN relative to one or more other received PDCP SNs. For example, when UE 120 receives abnormal PDCP SNs of '1599' and '1600' immediately after a state variable reset event and UE 120 had received PDCP SNs of, for example, '1597' and '1598' immediately prior to the state variable reset event, UE 120 may determine that the abnormal PDCP SNs were in-order with respect to PDCP packets received before the state variable reset event. In this case, UE 120 may determine that the abnormal PDCP SNs are a result of the state variable reset event rather than a relatively large amount of data loss. Similarly, when UE 120 receives abnormal PDCP SNs of '1599' and '1600' and then receives expected PDCP SNs of, for example, '0', '1', '2', and '3' in subsequent RLC packets, UE 120 may determine that the abnormal PDCP SNs are a result of the state variable reset event rather than a relatively large amount of data loss.

In contrast, when UE 120 receives abnormal PDCP SNs of '1599' and '1600' immediately after a state variable reset event and UE 120 had received PDCP SNs of, for example, '24,500' and '24,501' immediately prior to the state variable reset event, UE 120 may determine that the abnormal PDCP SNs were out-of-order with respect to PDCP packets received before the state variable reset event. In this case, UE 120 may determine that the abnormal PDCP SNs are not a result of the state variable reset event, and may be a result of a relatively large amount of data loss. Similarly, when UE 120 receives abnormal PDCP SNs of '1599' and '1600' then receives PDCP SNs of, for example, '1601', '1602', '1603', and '1604' in subsequent RLC packets, UE 120 may determine that the abnormal PDCP SNs are in-order with respect to subsequent PDCP SNs and may be a result of a relatively large amount of data loss.

In some aspects, UE 120 may discard the PDCP packets with abnormal PDCP SNs. For example, as described above, based at least in part on determining that the abnormal PDCP SNs are a result of the state variable reset event, UE 120 may discard the PDCP packets with abnormal PDCP SNs from the reordering window to avoid resetting the expected next PDCP SN of the reordering window to a relatively high value, which may result in data loss. In contrast, based at least in part on determining that the abnormal PDCP SNs are a result of data loss, UE 120 may include the PDCP packets with abnormal PDCP SNs in the reordering window to enable reordering of the PDCP packets with respect to other received PDCP packets. In some aspects, UE 120 may trigger a bearer synchronization event. For example, when the reordering criteria are satisfied and UE 120 and base station 110 are not synchronized from a PDCP SN perspective for a threshold amount of time or a threshold amount of PDCP PDUs, UE 120 may communicate with a base station 110 to cause a radio link failure (RLF). In this case, based at least in part on determining to discard the PDCP packets with the abnormal PDCP SNs, UE 120 may determine that UE 120 and base station 110 are not synchronized and may communicate with base station 110 to trigger RLF to enable a re-synchronization Additionally, or alternatively, UE 120 may transmit a re-establishment triggering message to cause a synchronization at a PDCP bearer level between UE 120 and base station 110. In another example, when a packet is received with an out-of-order SN (e.g., and reordered or dropped), but subsequent packets are in-order, UE 120 may accept the subsequent packets, despite some packet loss occurring between a PDCP entity and an RLC entity (e.g., without triggering PDCP bearer level re-synchronization).

As indicated above, FIG. 5 is provided as an example. Other examples may differ from what is described with respect to FIG. 5.

FIG. 6 is a diagram illustrating an example process 600 performed, for example, by a UE, in accordance with various aspects of the present disclosure. Example process 600 is an example where the UE (e.g., UE 120) performs operations associated with techniques for packet data convergence protocol and radio link control sequence number synchronization.

As shown in FIG. 6, in some aspects, process 600 may include receiving, at a PDCP layer, a packet having a PDCP sequence number (block 610). For example, the UE (e.g., using communication manager 140 and/or reception component 702, depicted in FIG. 7) may receive, at a packet data convergence protocol (PDCP) layer, a packet having a PDCP sequence number, as described above.

As further shown in FIG. 6, in some aspects, process 600 may include determining whether the received packet, having the PDCP sequence number, satisfies one or more reordering criteria (block 620). For example, the UE (e.g., using communication manager 140 and/or PDCP component 708, depicted in FIG. 7) may determine whether the received packet, having the PDCP sequence number, satisfies one or more reordering criteria, as described above.

As further shown in FIG. 6, in some aspects, process 600 may include discarding, before an expiration of a reordering timer, the received packet based at least in part on the determination of whether the received packet satisfies the one or more reordering criteria (block 630). For example, the UE (e.g., using PDCP component 708, depicted in FIG. 7) may discard, before an expiration of a reordering timer, the received packet based at least in part on the determination of whether the received packet satisfies the one or more reordering criteria, as described above.

Process 600 may include additional aspects, such as any single aspect or any combination of aspects described below and/or in connection with one or more other processes described elsewhere herein.

In a first aspect, receiving the packet includes receiving the packet after an event associated with a reset of one or more state variables.

In a second aspect, alone or in combination with the first aspect, the determination of whether the received packet satisfies the one or more reordering criteria includes determining whether the received packet is received after an event associated with a reset of one or more state variables.

In a third aspect, alone or in combination with one or more of the first and second aspects, the reset of the one or more state variables is associated with at least one of a full configuration procedure, a radio link control entity re-establishment procedure, or a PDCP entity re-establishment procedure.

In a fourth aspect, alone or in combination with one or more of the first through third aspects, the determination of whether the received packet satisfies the one or more reordering criteria includes determining whether the PDCP sequence number of the received packet differs from one or more PDCP sequence numbers of a reordering window associated with the reordering timer by a threshold amount.

In a fifth aspect, alone or in combination with one or more of the first through fourth aspects, the determination of whether the received packet satisfies the one or more reordering criteria includes determining whether the PDCP sequence number of the received packet is in-order with respect to one or more other PDCP sequence numbers associated with one or more other packets received after a state variable reset event.

In a sixth aspect, alone or in combination with one or more of the first through fifth aspects, the determination of whether the received packet satisfies the one or more reordering criteria includes determining whether the PDCP sequence number of the received packet is in-order with respect to one or more other PDCP sequence numbers associated with one or more other packets received before a state variable reset event.

In a seventh aspect, alone or in combination with one or more of the first through sixth aspects, process 600 includes determining that the one or more reordering criteria have been satisfied for a threshold period; and causing, based at least in part on determining that the one or more reordering criteria have been satisfied for the threshold period, a bearer synchronization event, wherein the bearer synchronization event includes a radio link failure recover or a connection re-establishment.

In an eighth aspect, alone or in combination with one or more of the first through seventh aspects, process 600 includes determining one or more subsequent packets, after the received packet, are in-order; and accepting the one or more subsequent packets without triggering a bearer synchronization event.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
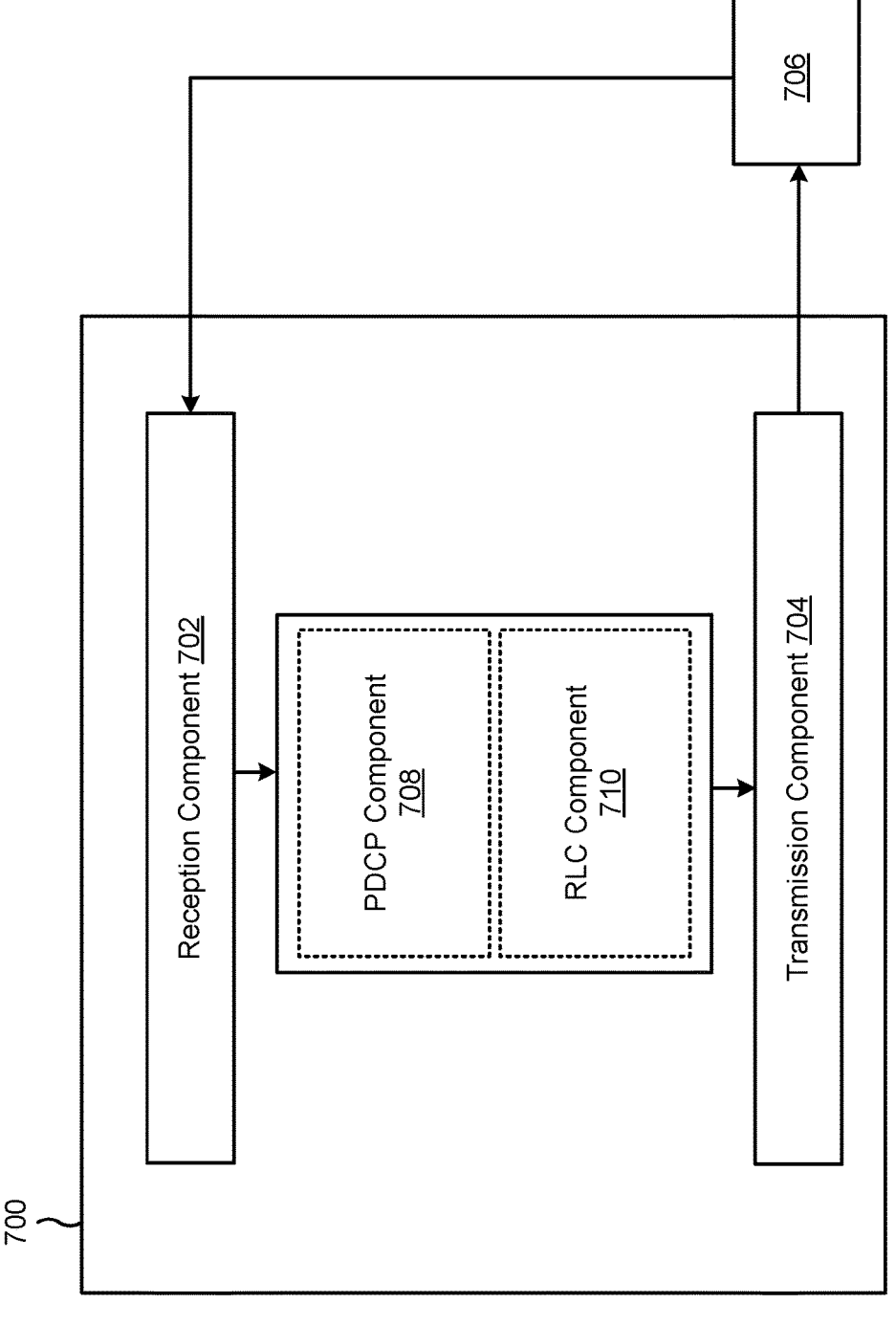
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a PDCP component 708 or an RLC component 710, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6, among other examples. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive, at a PDCP layer, a packet having a PDCP sequence number. The PDCP component 708 may determine whether the received packet, having the PDCP sequence number, satisfies one or more reordering criteria. The PDCP component 708 may discard, before an expiration of a reordering timer, the received packet based at least in part on the determination of whether the received packet satisfies the one or more reordering criteria. In some aspects, the PDCP component 708 may include one or more antennas, a demodulator, a receive processor, a controller/processor, a memory, or a combination thereof, of the UE described above in connection with FIG. 2. The RLC component 710 may determine whether an RLC packet, with a set of PDCP packets, is associated with a valid RLC SN and direct the RLC packet to the PDCP component 708. In some aspects, the PDCP component 708 may include one or more antennas, a demodulator, a receive processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
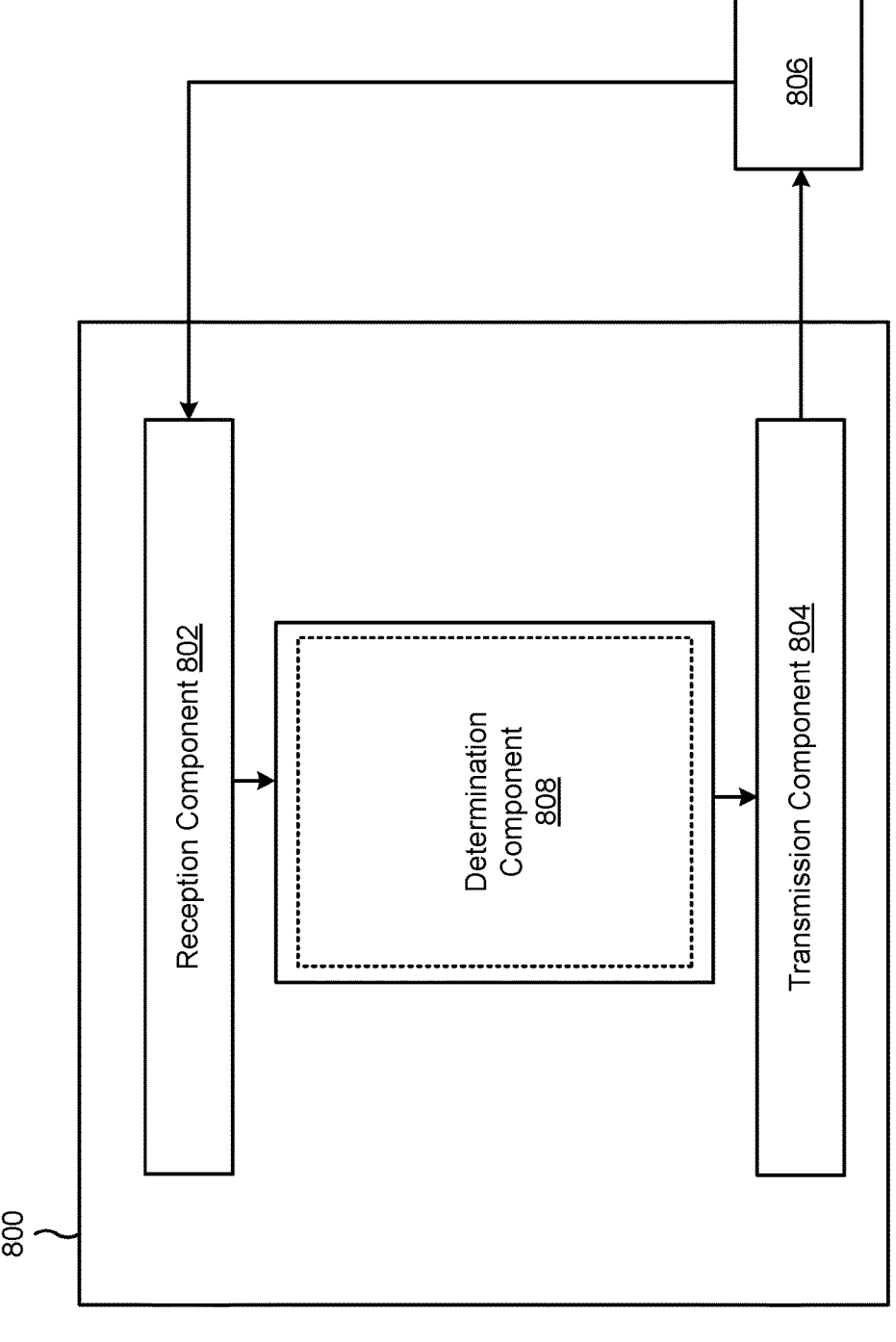

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808 among other examples.

In some aspects, the apparatus 800 may be configured to perform one or more operations described herein in connection with FIG. 5. Additionally, or alternatively, the apparatus 800 may be configured to perform one or more processes described herein. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be co-located with the reception component 802 in a transceiver.

The reception component 802 and/or transmission component 804 may communicate with the apparatus 806 to trigger a reset of a set of state variables of the apparatus 806. The transmission component 804 may transmit one or more RLC packets, each including one or more PDCP packets for processing and reordering by the apparatus 806.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving, at a packet data convergence protocol (PDCP) layer, a packet having a PDCP sequence number; determining whether the received packet, having the PDCP sequence number, satisfies one or more reordering criteria; and discarding, before an expiration of a reordering timer, the received packet based at least in part on the determination of whether the received packet satisfies the one or more reordering criteria.

Aspect 2: The method of Aspect 1, wherein receiving the packet comprises: receiving the packet after an event associated with a reset of one or more state variables.

Aspect 3: The method of any of Aspects 1 to 2, wherein the determination of whether the received packet satisfies the one or more reordering criteria comprises: determining whether the received packet is received after an event associated with a reset of one or more state variables.

Aspect 4: The method of Aspect 3, wherein the reset of the one or more state variables is associated with at least one of: a full configuration procedure, a radio link control entity re-establishment procedure, or a PDCP entity re-establishment procedure.

Aspect 5: The method of any of Aspects 1 to 4, wherein the determination of whether the received packet satisfies the one or more reordering criteria comprises: determining whether the PDCP sequence number of the received packet differs from one or more PDCP sequence numbers of a reordering window associated with the reordering timer by a threshold amount.

Aspect 6: The method of any of Aspects 1 to 5, wherein the determination of whether the received packet satisfies the one or more reordering criteria comprises: determining whether the PDCP sequence number of the received packet is in-order with respect to one or more other PDCP sequence numbers associated with one or more other packets received after a state variable reset event.

Aspect 7: The method of any of Aspects 1 to 6, wherein the determination of whether the received packet satisfies the one or more reordering criteria comprises: determining whether the PDCP sequence number of the received packet is in-order with respect to one or more other PDCP sequence numbers associated with one or more other packets received before a state variable reset event.

Aspect 8: The method of any of Aspects 1 to 7, further comprising: determining that the one or more reordering criteria have been satisfied for a threshold period; and causing, based at least in part on determining that the one or more reordering criteria have been satisfied for the threshold period, a bearer synchronization event, wherein the bearer synchronization event includes a radio link failure recover or a connection re-establishment.

Aspect 9: The method of any of Aspects 1 to 7, further comprising: determining one or more subsequent packets, after the received packet, are in-order; and accepting the one or more subsequent packets without triggering a bearer synchronization event.

Aspect 10: An apparatus for wireless communication at a device, comprising a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    one or more memories; and
    one or more processors coupled to the one or more memories, the one or more processors configured to:
        receive, at a packet data convergence protocol (PDCP) layer, a packet having a PDCP sequence number;
        determine whether the received packet, having the PDCP sequence number, satisfies one or more reordering criteria, wherein the one or more reordering criteria including the received packet is received after an event associated with a reset of one or more state variables; and
        discard, before an expiration of a reordering timer, the received packet based at least in part on the determination of whether the received packet satisfies the one or more reordering criteria.

2. The UE of claim 1, wherein the one or more processors, when receiving the packet, are configured to:
    receive the packet after an event associated with a reset of one or more state variables.

3. The UE of claim 1, wherein the reset of the one or more state variables is associated with at least one of:
    a full configuration procedure,
    a radio link control entity re-establishment procedure, or
    a PDCP entity re-establishment procedure.

4. The UE of claim 1, wherein the one or more processors, when determining whether the received packet satisfies the one or more reordering criteria, are configured to:
    determine whether the PDCP sequence number of the received packet differs from one or more PDCP sequence numbers of a reordering window associated with the reordering timer by a threshold amount.

5. The UE of claim 1, wherein the one or more processors, when determining whether the received packet satisfies the one or more reordering criteria, are configured to:
    determine whether the PDCP sequence number of the received packet is in-order with respect to one or more other PDCP sequence numbers associated with one or more other packets received after a state variable reset event.

6. The UE of claim 1, wherein the one or more processors, when determining whether the received packet satisfies the one or more reordering criteria, are configured to:
    determine whether the PDCP sequence number of the received packet is in-order with respect to one or more other PDCP sequence numbers associated with one or more other packets received before a state variable reset event.

7. The UE of claim 1, wherein the one or more processors are further configured to:
    determine that the one or more reordering criteria have been satisfied for a threshold period; and
    cause, based at least in part on determining that the one or more reordering criteria have been satisfied for the threshold period, a bearer synchronization event, wherein the bearer synchronization event includes a radio link failure recover or a connection re-establishment.

8. The UE of claim 1, wherein the one or more processors are further configured to:
    determine one or more subsequent packets, after the received packet, are in-order; and
    accept the one or more subsequent packets without triggering a bearer synchronization event.

9. A method of wireless communication performed by a user equipment (UE), comprising:
    receiving, at a packet data convergence protocol (PDCP) layer, a packet having a PDCP sequence number;
    determining whether the received packet, having the PDCP sequence number, satisfies one or more reordering criteria, wherein the one or more reordering criteria including the received packet is received after an event associated with a reset of one or more state variables; and
    discarding, before an expiration of a reordering timer, the received packet based at least in part on the determination of whether the received packet satisfies the one or more reordering criteria.

10. The method of claim 9, wherein receiving the packet comprises:
    receiving the packet after an event associated with a reset of one or more state variables.

11. The method of claim 9, wherein the reset of the one or more state variables is associated with at least one of:
    a full configuration procedure,
    a radio link control entity re-establishment procedure, or
    a PDCP entity re-establishment procedure.

12. The method of claim 9, wherein the determination of whether the received packet satisfies the one or more reordering criteria comprises:
    determining whether the PDCP sequence number of the received packet differs from one or more PDCP sequence numbers of a reordering window associated with the reordering timer by a threshold amount.

13. The method of claim 9, wherein the determination of whether the received packet satisfies the one or more reordering criteria comprises:
    determining whether the PDCP sequence number of the received packet is in-order with respect to one or more other PDCP sequence numbers associated with one or more other packets received after a state variable reset event.

14. The method of claim 9, wherein the determination of whether the received packet satisfies the one or more reordering criteria comprises:
    determining whether the PDCP sequence number of the received packet is in-order with respect to one or more other PDCP sequence numbers associated with one or more other packets received before a state variable reset event.

15. A non-transitory computer-readable medium storing a set of instructions for wireless communication, the set of instructions comprising:
one or more instructions that, when executed by one or more processors of a user equipment (UE), cause the UE to:
receive, at a packet data convergence protocol (PDCP) layer, a packet having a PDCP sequence number;
determine whether the received packet, having the PDCP sequence number, satisfies one or more reordering criteria, wherein the one or more reordering criteria including the received packet is received after an event associated with a reset of one or more state variables; and
discard, before an expiration of a reordering timer, the received packet based at least in part on the determination of whether the received packet satisfies the one or more reordering criteria.

16. The non-transitory computer-readable medium of claim 15, wherein the one or more instructions, that cause the UE to receive the packet, cause the UE to:
receive the packet after an event associated with a reset of one or more state variables.

17. The non-transitory computer-readable medium of claim 15, wherein the reset of the one or more state variables is associated with at least one of:
a full configuration procedure,
a radio link control entity re-establishment procedure, or
a PDCP entity re-establishment procedure.

18. The non-transitory computer-readable medium of claim 15, wherein the one or more instructions, that cause the one or more processors to determine whether the received packet satisfies the one or more reordering criteria, cause the one or more processors to:
determine whether the PDCP sequence number of the received packet differs from one or more PDCP sequence numbers of a reordering window associated with the reordering timer by a threshold amount.

19. The non-transitory computer-readable medium of claim 15, wherein the one or more instructions, that cause the one or more processors to determine whether the received packet satisfies the one or more reordering criteria, cause the one or more processors to:
determine whether the PDCP sequence number of the received packet is in-order with respect to one or more other PDCP sequence numbers associated with one or more other packets received after a state variable reset event.

20. The non-transitory computer-readable medium of claim 15, wherein the one or more instructions, that cause the one or more processors to determine whether the received packet satisfies the one or more reordering criteria, cause the one or more processors to:
determine whether the PDCP sequence number of the received packet is in-order with respect to one or more other PDCP sequence numbers associated with one or more other packets received before a state variable reset event.

21. An apparatus for wireless communication, comprising:
means for receiving, at a packet data convergence protocol (PDCP) layer, a packet having a PDCP sequence number;
means for determining whether the received packet, having the PDCP sequence number, satisfies one or more reordering criteria, wherein the one or more reordering criteria including the received packet is received after an event associated with a reset of one or more state variables; and
means for discarding, before an expiration of a reordering timer, the received packet based at least in part on the determination of whether the received packet satisfies the one or more reordering criteria.

22. The apparatus of claim 21, wherein the means for receiving the packet comprises:
means for receiving the packet after an event associated with a reset of one or more state variables.

23. The apparatus of claim 21, wherein the reset of the one or more state variables is associated with at least one of:
a full configuration procedure,
a radio link control entity re-establishment procedure, or
a PDCP entity re-establishment procedure.

24. The apparatus of claim 21, wherein the means for determining whether the received packet satisfies the one or more reordering criteria comprises:
means for determining whether the PDCP sequence number of the received packet differs from one or more PDCP sequence numbers of a reordering window associated with the reordering timer by a threshold amount.

25. The apparatus of claim 21, wherein the means for determining whether the received packet satisfies the one or more reordering criteria comprises:
means for determining whether the PDCP sequence number of the received packet is in-order with respect to one or more other PDCP sequence numbers associated with one or more other packets received after a state variable reset event.

26. The apparatus of claim 21, wherein the means for determining whether the received packet satisfies the one or more reordering criteria comprises:
means for determining whether the PDCP sequence number of the received packet is in-order with respect to one or more other PDCP sequence numbers associated with one or more other packets received before a state variable reset event.

* * * * *